Nov. 29, 1932.      G. GORTON      1,889,653
CUTTER HEAD ASSEMBLY FOR ROUTING AND OTHER MACHINE TOOLS
Filed Aug. 21, 1929      4 Sheets-Sheet 1

Nov. 29, 1932.　　　　G. GORTON　　　　1,889,653
CUTTER HEAD ASSEMBLY FOR ROUTING AND OTHER MACHINE TOOLS
Filed Aug. 21, 1929　　　4 Sheets-Sheet 2

Inventor
George Gorton
By
Hubert E. Peck  Attorney

Nov. 29, 1932.　　　　G. GORTON　　　　1,889,653
CUTTER HEAD ASSEMBLY FOR ROUTING AND OTHER MACHINE TOOLS
Filed Aug. 21, 1929　　　4 Sheets-Sheet 3
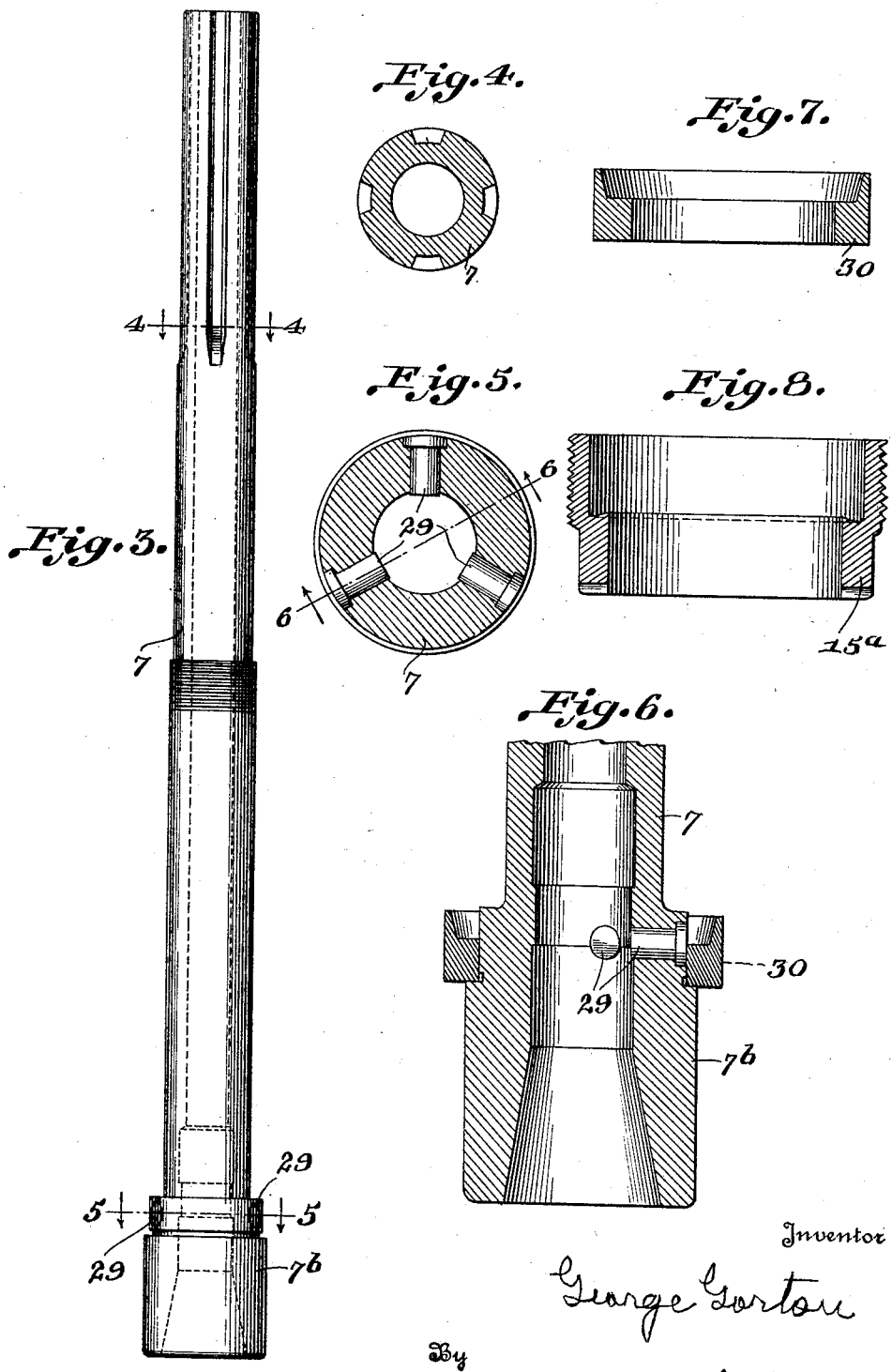

Nov. 29, 1932.     G. GORTON     1,889,653
CUTTER HEAD ASSEMBLY FOR ROUTING AND OTHER MACHINE TOOLS
Filed Aug. 21, 1929     4 Sheets-Sheet 4
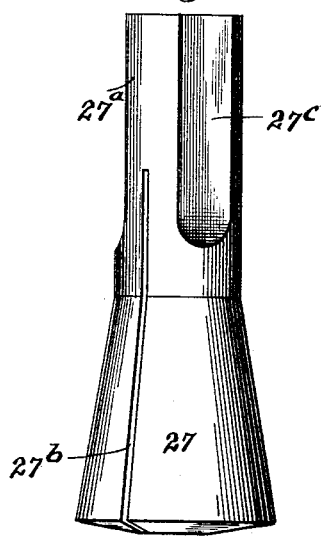
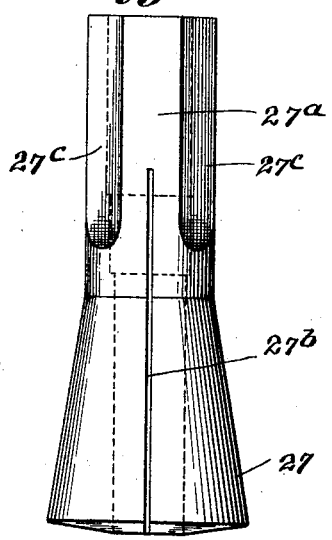
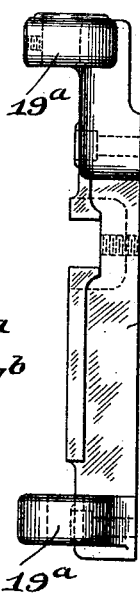
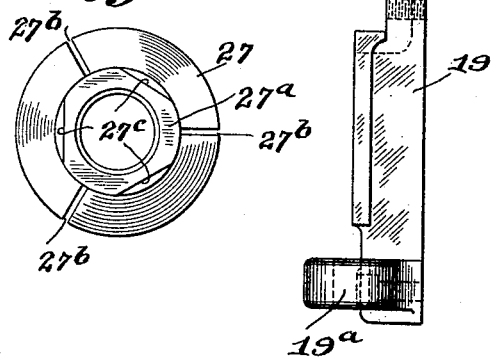
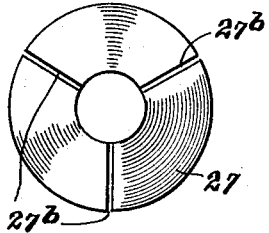
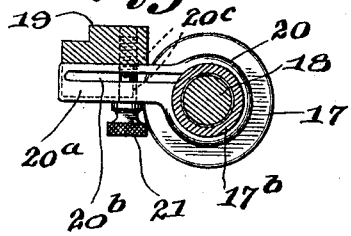
Inventor
George Gorton
By Hubert T. Peck
Attorney Patented Nov. 29, 1932

1,889,653

UNITED STATES PATENT OFFICE

GEORGE GORTON, OF RACINE, WISCONSIN

CUTTER HEAD ASSEMBLY FOR ROUTING AND OTHER MACHINE TOOLS

Application filed August 21, 1929. Serial No. 387,330.

This invention provides an improved cutter head assembly for routing and other rotary cutter spindle machine tools; and the objects and nature of the invention will be understood by those skilled in the art in the light of the following explanations of the accompanying drawings that show what I now believe to be the preferred mechanical expression or embodiment of my invention from among other constructions, arrangements and combinations within the spirit and scope of my invention.

An object of the invention is to provide an improved cutter head assembly for rotary cutter spindles with the ends in view of increasing the accuracy of adjustments, the durability of operating parts and their accuracy in operation.

With the foregoing and other objects in view, the invention consists in certain novel features in construction, assembly, arrangement or combinations, as more fully and particularly explained and specified hereinafter.

Referring to the accompanying drawings, forming a part hereof:

Fig. 3 is a detail elevation of the rotary cutter spindle before application of the ring for retaining the radial pins that hold the collet against relative rotary movement, said pins being shown in operative position preparatory to securing by subsequent application of said ring.

Fig. 4 is an enlarged cross section on the line 4—4, Fig. 3.
Fig. 5 is an enlarged cross section on the line 5—5, Fig. 3, the exterior ring for retaining the pins not being shown.

Fig. 6 is a detail enlarged longitudinal section of the lower end portion of the rotary cutter spindle taken on the line 6—6, Fig. 5 showing the permanent exterior ring for retaining the radial pins.

Fig. 7 is an enlarged section of the ring that is exteriorly applied to the cutter spindle to retain the radial pins.

Fig. 8 shows the ring nut screwed into the lower end of the barrel, in detail enlarged longitudinal section.

Fig. 9 shows the collet in enlarged elevation.

Fig. 10 shows the collet enlarged in inner end elevation, but on a reduced scale with respect to the scale of Fig. 3.

Fig. 11 shows the collet enlarged in side elevation from a different angle than that of Fig. 9.

Fig. 12 shows the collet enlarged in outer end elevation.

Fig. 13 shows the depth stop bracket in edge elevation, detached.

Fig. 14 is a detail horizontal section on the line 14—14, Fig. 1.

Figure 1:
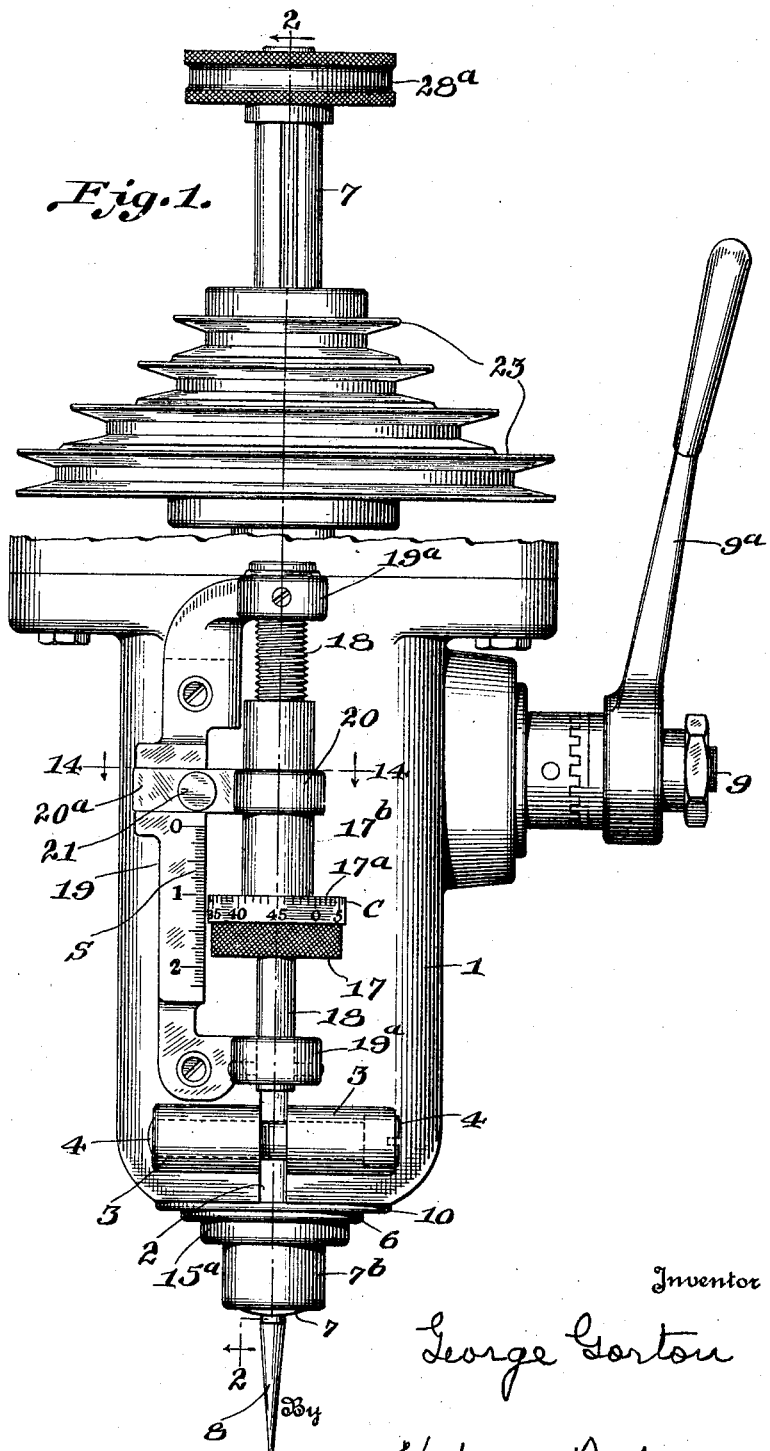
Fig. 1 is a front elevation of the cutter head.
Figure 2:
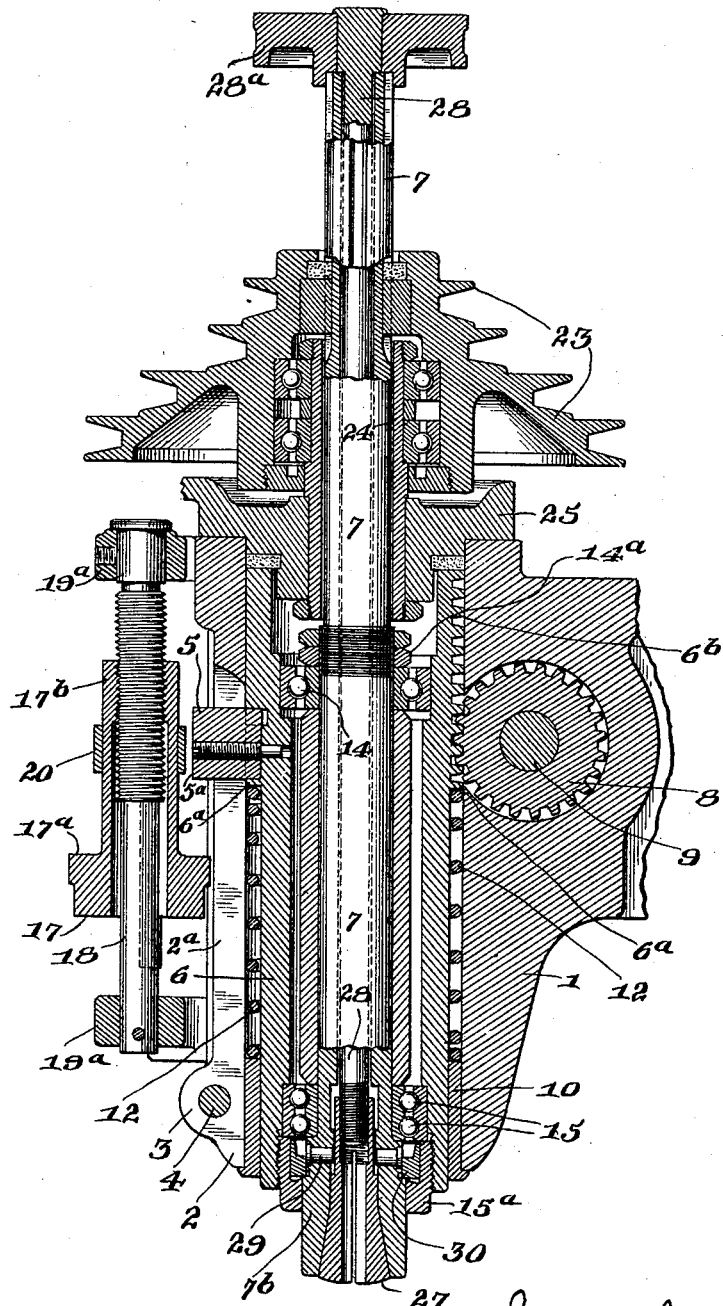
Fig. 2 is a vertical section, on the line 2—2, Fig. 1.

In the embodiment illustrated, the head embodies a supporting housing 1, formed with a preferably cylindrical bore extending vertically and approximately centrally therethrough and opening through the top and bottom ends thereof. This housing is usually composed of a single casting, although I do not wish to so limit my invention. The housing is longitudinally split throughout, at least at the lower portion of its length, by longitudinal vertical front slot 2, extending radially through the front of the housing into the bore thereof whereby the lower end of the housing constitutes a radially expansible and contractile split clamp, formed with forwardly extending parallel spaced front ears 3, transversely perforated, one of which is tapped, for the passage of horizontal front rotary threaded clamping bolt 4, exteriorly accessible at one end at least, for manual rotation to contract the lower end of the housing or to permit the same to expand by reason of the natural resiliency of the metal of the split ring.

In the embodiment shown, the front vertical radial slot 2, in the lower end of the housing to render said lower end contractile, is extended vertically from said split clamp in the form of vertical guideway 2a, having parallel longitudinal side walls, to accommodate a forwardly projecting lug 5, movable vertically in said slot and slidable along said parallel edge walls, to maintain a longitudinally slidable non-rotary spindle barrel or sleeve 6, confined in the housing bore, against rotary or axial movement, and also forming an element of cutter depth stop means, hereinafter described.

However, in this embodiment, the vertical guide slot 2a, terminates short of the upper end portion of the housing which forms an unbroken circle surrounding the vertical bore.

The longitudinally-hollow non-rotary spindle barrel or sleeve 6, is arranged longitudinally of the housing bore and usually extends approximately throughout the bore length and depends from the lower end thereof, and carries the rotary cutter spindle 7, which is mounted to rotate therein and is carried thereby to and from the work.

The lower end of spindle 7, depends from the lower end of the slide sleeve 6, and carries any suitable rotary cutter or other tool 8. The spindle 7, projects upwardly from the upper end of slide sleeve 6, in the example shown, and to an elevation above the cutter head housing, to receive the cutter spindle drive, as more fully explained hereinafter. The vertical bore of the cutter head housing is preferably cylindrical and of uniform diameter throughout its length.

The spindle barrel 6, is also exteriorly cylindrical although its lower portion is of reduced diameter with respect to its upper portion, whereby the intermediate annular downwardly facing shoulder 6a, is formed. The large exterior diameter portion of the barrel or sleeve above the shoulder 6a, snugly and slidably fits the cylindrical surface of the bore, and at its rear longitudinal portion is provided with gear rack 6b, preferably cut in the barrel, by which the barrel is raised and lowered to feed the cutter to and from the work. The barrel is thus raised and lowered by gear 8, meshing with said rack and fixed on cross shaft 9, extending horizontally through and mounted in the cutter head, in rear of the barrel 6, and provided with exterior handle 9a.

The lower end of the barrel 6, extends through and slidably and snugly fits the cylindrical inner surface of a comparatively-short cylindrical contractile metal bearing ring or bushing 10, normally fixedly clamped in the lower end of the housing bore, by the bushing-contracting split ring clamp formation thereof. This bushing 10, is forced upwardly into the housing bore through the lower end thereof, and is held rigidly therein by tightening bolt 4 and thereafter, as recurring barrel looseness develops from wear, such looseness can, in each progressive instance, be taken up, by further progressively reducing or tightening the clamp from time to time to repeatedly further contract or reduce the bushing 10, on and around the barrel. The bushing is removable for replacement, when the split clamp is expanded by loosening the clamping bolt. The exterior cylindrical surface of the spindle barrel and the cylindrical surfaces of the removable guide ring 10, are accurately ground and relatively formed to maintain an accurate guiding fit between the lower end of the barrel and the interior of the ring to avoid lateral looseness of the barrel.

A coiled spring 12, is arranged exteriorly and longitudinally of the barrel and compressed between shoulder 6a and the top edge of ring 10, to approximately "float" or counterbalance the weight of the barrel and its load, in the operation of raising and lowering the same.

The rotary cutter spindle 7, is provided at its projecting lower end with means, hereinafter described, for rigidly holding the depending axially alined cutter 8, and providing for removal and replacement of cutters. The rotary spindle 7, extends longitudinally through and is centrally arranged in its barrel, and is held therein against objectionable relative longitudinal and radial movements by suitable end and radial thrust bearings.

For instance, I show the rotary cutter spindle 7, carried by its non-rotary barrel 6, through the medium of upper and lower sets of ball bearings 14, 15, clamped in place by nut 14a, on intermediate screw threaded portion of spindle 7, and ring nut 15a, projecting down from and screwed up into the enlarged lower end of the bore of barrel 7, and more or less snugly surrounding the enlarged cylindrical depending lower end of said spindle.

Without limitation as to the means employed to secure the cutter 8, to and depending from the cutter spindle and without limitation as to the driving means employed to rotate the cutter spindle or how and where such driving means is applied to the cutter spindle, reciprocation of the cutter spindle barrel carries the cutter to and from the work and holds the cutter to operation in the work, and depth stop means cooperating with the barrel predetermines the working depth of the cutter in the work, and it is highly desirable that such depth stop be exceedingly accurate and capable of micrometer adjustment. In the example shown, the lug 5, constitutes an element of the depth stop mechanism or means. This lug is of substantial rigid construction and dimensions and is rigidly fixed to the spindle barrel 6, and projects forwardly radially therefrom through and forwardly beyond the vertical guide slot 2a, and the flat bottom horizontal face of said lug provides the abutment stop face 5a, that overhangs the opposing flat top abutment stop face 17a, of a vertically adjustable stop member 17, supported independently of lug 5, and the spindle barrel 6, and in cooperation with lug 5, determining the working or cutting depth of cutter 8. The stop member 17, is formed by an enlarged cylindrical nut, head or finger wheel the top surface of which provides the stop face 17a, in annular flat horizontal form. The head 17, is integral or rigid with an elongated internally screw threaded sleeve 17b, upstanding from and axially alined with head 17. The rotary nut formed by preferably knurled finger head 17, and sleeve 17b, longitudinally receives and meshes with the longitudinal screw thread of vertical elongated fixed screw threaded shaft 18, carrying said nut which is vertically adjustable by rotation thereon.

The fixed shaft 18, carried by a vertical bracket 19, fixed to the front of the cutter head housing to one side of the vertical plane of the guide slot 2a. This bracket has rigid upper and lower lateral arms 19a, receiving the ends of shaft 18, and in which said ends are normally fixed. The shaft 18, and consequently the nut 17, 17b, thereon, is spaced forwardly from and located directly in front of guide slot 2a, with the sleeve 17b, of said nut in advance of lug 5, and with the rear portion of head 17, of the nut located under lug 5, to limit the downward movement thereof.

The cylindrical circumference of the head 17, is arranged close to the adjacent vertical edge of bracket 19, the front face of which is provided with a vertical scale s, and the head 17, is also provided with a circumferential scale c. The scale s, preferably reads downwardly from zero and the graduations can be in inches, subdivided, say into quarters and twentieths, with one complete revolution of the nut equal to one twentieth of an inch vertical movement of the nut reading on scale s. The graduations of scale c, can be in thousandths of an inch, whereby the cutting depth of the cutter 8, can be set within a thousandth of an inch.

To avoid danger of accidental movement of the stop nut 17, 17b, after being set to the cutting depth desired, I provide a quick acting clamp to lock the nut against movement with respect to its shaft 18, and supporting bracket 19. In the particular embodiment shown, this clamp consists of a resilient metal split ring or band 20, normally loosely surrounding the cylindrical sleeve 17b, of the nut, and formed in one piece with a flat laterally projecting shank 20a, extending transversely across the bracket 19, and removably fitted in a transverse depressed socket or seat extending across the front of said bracket above the scale s. The shank 20a, is longitudinally slotted, at 20b, throughout a portion of its length with the slot at its inner end opening into the resilient contractile ring 20. Intermediate its length, the shank 20a, is formed with a transverse screw hole or perforation 20c, perpendicular to and opening into the longitudinal slot 20b. This hole 20c, receives a clamping or ring contracting headed screw 21, which screws into a tapped hole in the floor of the shank receiving socket in bracket 19, to removably hold the shank to the bracket and to contract and permit expansion of the resilient band or ring clamp 20. By tightening up the clamping screw 21, the clamp 20, is contracted to tightly hold the nut 17, against rotation. By loosening the screw 21, the resiliency of the metal will cause expansion of ring 20, and release the nut for rotary adjustment.

Merely as an example of an appropriate drive for the cutter spindle 7, I show a spindle drive pulley 23, on the upwardly extended end of the pulley, the spindle and pulley being splined together so that the pulley is always operatively coupled to the spindle to drive the same and the spindle is free to move vertically through the pulley. The pulley is adapted to be rotated by any suitable belt or other driving transmission. The pulley is mounted on and carried by an upstanding sleeve 24, fixed in and extending down through a hub 25, fixed in the upper end of the bore through the cutter head housing. The rotary cutter spindle extends through and to a point above the sleeve 24, and the drive pulley.

The lower end head 7b of the rotary cutter spindle is of enlarged diameter and exteriorly cylindrical where it depends through and fits and rotates in the ring nut 15a. The spindle is hollow throughout its length, and in head 7b, the spindle bore enlarges or flares to the end opening of the spindle so that the lower end of the bore is in the form of an upwardly contracting cone, to receive and contract the longitudinally tapered cutter holding and gripping collet 27, extending upwardly in and longitudinally of the spindle and having the internally longitudinally threaded shank 27a, as usual, that receives and meshes with the longitudinally threaded lower end of the draw bar 28, extending upwardly within the spindle and above the upper end thereof provided with handle 28a by which the draw bar can be rotated in the spindle, when the spindle is held against rotation, to draw the collet upwardly tightly into the tapered bore to rigidly clamp the cutter to and in the spindle, or to rotate the draw bar in the opposite direction to permit the collet to move down and open to release and receive cutters.

The collet 27, is rendered expansible and contractile, in the example shown by three uniformly spaced longitudinal slots 27b, extending through its lower end upwardly part way the length of the collet.

The longitudinal shank portion of the collet is formed, in this example, with three longitudinal elongated uniformly spaced flats 27c, to cooperate with three complementary inwardly-projecting radial similar pins 29, respectively, carried by the rotary spindle, to prevent rotation of the collet relative to the spindle and to permit relative longitudinal movement of the collet. These pins are composed of strong hard material and are headed at their outer ends and are slipped into countersunk radial uniformly spaced radial holes drilled in the rotary cutter spindle at a reduced portion of the upper end of the bottom end head of said spindle. The pins are of sufficient length to project into the bore of the spindle and engage said flat faces of the collet. These strong pins are locked against outward movement by exterior ring 30, driven to permanent positoin on said reduced upper end of the spindle head exteriorly covering and backing the pin heads.

This arrangement permits the utilization of strong hard pins and reduces pin breakage and damage to the minimum and by the employment of collet flats in combination with the pin ends, it is an easy and quick operation to insert the collet in and withdraw the same from the cutter spindle head.

The flats 27c, are more or less loosely engaged by the flats formed by the flat or squarely cut off inner ends of pins 29, as the inner ends of the pins preferably barely clear the surfaces of flats 27c, so that the collet is slightly free or loose yet is prevented by the pins from objectionable relative axial movement in the spindle. In the specific embodiment shown, three uniformly spaced pins 29, are employed, yet I do not wish to thus limit the broader phase of this feature of my invention. Specifically considered, the collet is thus driven from several balanced points, namely; the flats and pin ends, and an exceedingly rugged durable drive is provided with possibility of pin breakage reduced to the minimum, and furthermore the collet can be quickly and easily slipped to operative position in the spindle with not more than a possible third of a revolution to bring the flats and pin ends into registration. This simple collet drive solves the heretofore serious problem of drive pin breakage and drive pin displacement.

I do not herein make claim to that feature of the disclosure hereof involving the contractile bushing 10, and a clamp or holder for progressively contracting the bushing around the barrel to take up recurring lateral looseness of the barrel developing from wear, as I make claim based on such feature in my application Serial No. 529,157, filed April 10, 1931, as a continuation in part of the instant case.

It is evident that various changes, departures, additions, and modifications might be resorted to without departing from the spirit and scope of my invention substantially as defined by the following claims when construed in the light of the prior art to determine the scope to be accorded thereto, and hence the foregoing disclosure is presented as explanatory and not as limiting except where so required by the prior art.

What I claim is:—

1. A cutter head assembly embodying a supporting housing having a longitudinal guide slot; a barrel provided with and carrying a rotary cutter head spindle, said barrel longitudinally arranged and slidable in said housing and provided with a stop lug rigid therewith and projecting outwardly through and beyond said slot; a normally-fixed screw threaded shaft parallel with said slot and spaced outwardly therefrom; and an internally-threaded rotary sleeve on said shaft and meshing with the thread thereof and provided with a portion of increased diameter forming an annular top stop abutment below and adapted to abut the bottom edge of said lug to predetermine the cutting depth of the cutter carried by said spindle, a fixed longitudinal scale being provided along the path of movement of said enlarged diameter portion, said enlarged portion having a scale around the circumference thereof.

2. A cutter head assembly embodying a supporting housing having a longitudinal guide slot; a rotary cutter spindle barrel longitudinally arranged and slidable in said housing and provided with a cutter depth stop member projecting outwardly through said slot; a bracket normally fixed to the exterior of said housing and provided with a normally fixed screw threaded shaft parallel with and spaced outwardly from the path of movement of said slide stop member; a rotary nut meshing with the screw thread of and adjustable vertically on said shaft and providing an annular stop face in the path of movement of said stop member to abut the same and predetermine the working depth of the rotary spindle cutter, said nut having a visible scale around the circumference thereof, and said bracket providing a longitudinal visible scale for reading in connection with said nut and the scale thereof.

3. A cutter head assembly embodying a supporting housing; a rotary cutter spindle slide longitudinally arranged and slidable in said housing and having a cutter depth stop member movable longitudinally therewith; a rotary longitudinally adjustable sleeve providing an abutting face in the path of movement of said stop member to constitute an opposing stop for predetermining the working depth of the cutter spindle; means including a normally stationary screw-threaded portion supporting said sleeve at the exterior of the housing and rendering the sleeve longitudinally adjustable by rotation; and a contractile manually-operated clamp supported at the housing exterior for locking said sleeve against accidental rotation when set to the desired adjustment.

4. A cutter head assembly embodying a supporting housing; a rotary adjusting member; and a contractile spring ring clamp embracing said member and provided with a lateral shank whereby the clamp is supported at the exterior of the housing independently of the member, said clamp provided with a clamping screw for contracting the clamp to lock said member and for permitting the clamp to expand to release said member, said screw confining said shank to its support.

5. A cutter head assembly embodying a supporting housing, a rotary cutter spindle carried thereby and extending longitudinally therethrough, said spindle having a longitudinal bore at one end flared to provide a collet contracting taper; a tapered split expansible cutter clamping collet longitudinally movable in said end of the spindle bore, a draw rod in said bore having screw threaded connection with said collet, said collet having an exterior flat; a pin extending radially through the spindle and projecting into the bore thereof to engage said flat to prevent relative rotation of the collet; and a stationary ring on the spindle and holding said pin against outward movement.

6. A cutter head assembly embodying a rotary cutter spindle having a bore with a flared tapered end and a series of spaced radial holes, headed pins in said holes and projecting into the bore, a ring surrounding the spindle and holding the pins against outward movement; and a cutter clamping expansible collet and its controlling draw bar, said collet exteriorly and longitudinally formed to be engaged and held against relative rotation by said pins.

7. A cutter head assembly embodying a rotary cutter head spindle having a longitudinal bore and a radial hole extending into said bore, a pin in said hole and at its inner end projecting a limited distance into said bore, an exterior relatively fixed ring on said spindle and holding said pin against outward movement, and a cutter holding collet removably held in said bore and having a longitudinal exterior flat for engagement by said pin to hold the collet to rotation with the spindle.

8. In a cutter head assembly, in combination; a rotary cutter spindle; a reciprocatory barrel carrying said spindle and by which said spindle is moved to and from the work and held in working and withdrawn positions; a support for and relatively stationary with respect to said barrel; and depth stop means for setting the limit of movement of said barrel toward the work to determine the working depth or plane of the rotary cutter, said means including an elongated normally fixed scale carried by and visible at the exterior of said support and having its longitudinal axis parallel with the path of the reciprocation of said barrel, a barrel depth stop member movable with said barrel; an annular longitudinally adjustable rotary complementary depth stop member constantly arranged in the path of movement of said barrel member to engage the same and limit the movement thereof toward the work, and a screw threaded supporting connection between said rotary member and said support whereby said rotary member by rotation thereof is adjusted longitudinally of and adjacent to said longitudinal scale and is held in the position to which adjusted, said rotary member having a visible scale around its periphery adjacent to and for reading in connection with said longitudinal scale.

9. In a cutter head assembly, in combination; a housing; a rotary cutter spindle barrel slidable in said housing toward and from the work, and provided with the rotary cutter spindle; a visible elongated unit scale; a rotary depth stop member arranged adjacent to said elongated scale and adjustable longitudinally thereof and provided with a frictional circular scale around its periphery and visible with said longitudinal scale from the exterior of the housing; supporting and adjusting means whereby said rotary member is adjustable in either direction along and longitudinally of said longitudinal scale and is held in the relative position to which adjusted; and a complementary depth stop member to cooperate with said rotary member in limiting the movement of the barrel toward the work.

10. In a cutter head assembly, in combination; a housing having a longitudinal slot; a barrel slidable longitudinally of said housing and having a barrel depth stop lug movable longitudinally therewith and located in said slot and thereby holding the barrel against rotary movement; a complementary opposing depth stop member located in the longitudinal path of movement of said lug to limit the movement of the barrel toward the work; and supporting means for said member carried by the housing and whereby said member is manually adjustable longitudinally of said path of movement and is held in the position to which adjusted.

11. In combination; a support; a rotary cutter spindle; a carrier therefor movable longitudinally to carry the cutter of said spindle toward and from the work and to determine the working depth of the cutter; and depth stop means to predetermine said working depth, including an elongated visible scale parallel with said path of movement of said carrier; and complementary depth stop members, one movable with the carrier, and the other supported independently of the carrier and the other supported independently of the carrier and arranged in the path of the first named member to limit the carrier movement toward the work; one of said members being rotatable and located beside said scale and having a circumferential visible scale for reading in connection with said elongated scale, said rotatable member being adjustable longitudinally with respect to said elongated scale by rotation and providing an annular stop surface opposing said member movable with the carrier.

12. In combination; a support; a carrier, a rotary cutter spindle carried thereby toward and from the work with respect to the support; a visible elongated unit scale arranged longitudinally of the path of carrier movement toward and from the work; a rotary depth stop member for cooperating with said carrier to predetermine the limit of movement thereof toward the work, and arranged beside said scale and adjustable longitudinally thereof by rotation and provided with an annular visible fractional scale for reading with said unit scale; and a screw threaded supporting connection for said stop member whereby said member is by rotation adjustable longitudinally with respect to said path of movement and is held in the position to which adjusted.

13. In combination; a support; a rotary cutter spindle carrier movable with respect to said support toward and from the work and provided with the rotary cutter spindle; a visible elongated unit scale; a rotary depth stop member arranged adjacent to said elongated scale and adjustable longitudinally with respect thereto and provided with a fractional circumferential scale visible beside for reading with said longitudinal scale; said stop member providing an annular stop surface; supporting and adjusting means whereby said rotary member is adjustable in either direction along and longitudinally of said longitudinal scale and is held in the relative position to which adjusted; and a complementary depth stop member to cooperate with the annular surface of said rotary member in limiting the movement of said carrier toward the work.

14. In combination; a support; a rotary cutter spindle; a longitudinally reciprocatory carrier for said spindle and by which said spindle is moved to and from the work; and depth stop means for setting the limit of movement of said carrier toward the work to predetermine the working depth of the rotary cutter, including a depth stop member movable with said carrier, an annular longitudinally adjustable rotary complementary depth stop member having a single annular stop surface arranged in the path of movement of said carrier member to engage the same and limit the movement of the carrier toward the work, and a screw threaded supporting connection between said rotary member and said support whereby said rotary member by rotation is adjusted longitudinally with respect to the path of movement of the carrier and is held in the position to which adjusted.

15. In combination; a rotary cutter spindle and its carrier; means for longitudinally feeding the same toward and from the work; a support for said carrier; and cutter depth stop mechanism embodying a carrier depth stop member movable toward and from the work with said carrier, and a normally stationary complementary rotary depth stop member to cooperate with said first named member in limiting the carrier movement toward the work; screw threaded means whereby said rotary member is supported independently of said carrier and whereby said rotary member by rotation is adjusted to various positions along the path of movement of said carrier member, said rotary member having a circular visible scale; and a visible normally fixed scale for reading with said circular scale and elongated beside the path of adjusting movement of said rotary member.

16. In combination; a rotary cutter spindle and its carrier; said carrier being movable to carry the cutter of said spindle toward and from the work and to determine the working depth of said cutter; a guiding support for said carrier; and cutter depth stop mechanism for predetermining the working depth of said cutter, embodying a carrier stop member moving therewith, a normally fixed bracket on said support, a normally stationary stop member in the path of movement of said carrier member to cooperate therewith in limiting the spindle movement toward the work, means supporting said normally stationary stop member from said bracket and whereby said last mentioned member can be adjusted and held at various positions along said path of movement, an elongated scale beside said normally stationary member and carried by said bracket for guidance in adjusting said last mentioned member, and means for temporarily locking said normally stationary member in its adjusted positions.

17. A cutter head assembly embodying a rotary cutter spindle having a longitudinal bore providing a collet contracting portion, said spindle having a radial hole opening into said bore, a pin projecting from said hole into said bore; an exterior ring holding said pin against outward movement in said hole; and a removable tapered contractile cutter holding collet longitudinally arranged in said bore, said collet having a shank provided with a longitudinal depression extending to the inner end thereof to cooperate with the inner end of said pin to drive the collet with the spindle and to permit longitudinal removal and insertion of the collet.

18. A cutter head assembly including a rotary cutter spindle having a longitudinal bore providing a collet contracting portion; and a longitudinally movable tapered contractile cutter holding collet longitudinally arranged and movable in said bore, and provided with means for moving the same longitudinally in said bore to contract and permit expansion of said collet, said collet having a shank formed with wide exterior longitudinal flats extending to the shank end, said spindle having means extending into said bore to cooperate with said flats in driving the collet and in permitting longitudinal movement of the collet in the spindle and removal and insertion thereof.

19. In combination; a support; a carrier provided with a rotary cutter spindle, said carrier being movable with respect to said support to carry the cutter toward and from the work, said carrier having an exterior projecting depth stop movable therewith toward and from the work to limit the working depth of said cutter; a rotary sleeve having an annular stop abutment located below said depth stop to abut the same and determine said cutter working depth; and a normally-fixed elongated threaded shaft arranged longitudinally beside the path of movement of said depth stop and supported exteriorly and independently of said carrier, said sleeve being threaded on said shaft and adjustable approximately throughout the length thereof by rotation with said annular stop abutment intersecting the path of movement of said depth stop throughout the longitudinal adjustments of said sleeve by rotation on said shaft.

Signed at Racine, county of Racine, Wisconsin, this 11th day of July, 1929.

GEORGE GORTON.